United States Patent
Lathia et al.

(10) Patent No.: US 10,203,890 B1
(45) Date of Patent: Feb. 12, 2019

(54) MULTI-TIER MECHANISM TO ACHIEVE HIGH AVAILABILITY IN A MULTI-CONTROLLER SYSTEM

(71) Applicant: Tintri Inc., Mountain View, CA (US)

(72) Inventors: Chirag Lathia, San Bruno, CA (US); Amar Vutukuru, San Jose, CA (US)

(73) Assignee: Tintri Inc., Mountain View, CA (US)

( * ) Notice: Subject to any disclaimer, the term of this patent is extended or adjusted under 35 U.S.C. 154(b) by 13 days.

(21) Appl. No.: 15/271,156

(22) Filed: Sep. 20, 2016

(51) Int. Cl.
*G06F 3/06* (2006.01)

(52) U.S. Cl.
CPC .......... *G06F 3/0619* (2013.01); *G06F 3/0665* (2013.01); *G06F 3/0689* (2013.01)

(58) Field of Classification Search
CPC ..... G06F 3/0619; G06F 3/0665; G06F 3/0689
See application file for complete search history.

(56) References Cited

U.S. PATENT DOCUMENTS

| | | | | |
|---|---|---|---|---|
| 7,003,687 B2* | 2/2006 | Matsunami | ......... | G06F 11/0727 714/4.5 |
| 7,076,687 B2* | 7/2006 | Fujibayashi | ........ | G06F 11/0727 714/42 |
| 7,142,650 B1* | 11/2006 | Kult | .......... | H04M 3/24 379/112.01 |
| 8,560,747 B1* | 10/2013 | Tan | ........... | G06F 9/526 710/200 |
| 2003/0084161 A1* | 5/2003 | Watson | .......... | H04L 69/16 709/227 |
| 2004/0032844 A1* | 2/2004 | Lewis | ...... | H04L 63/08 370/338 |
| 2005/0172161 A1* | 8/2005 | Cruz | ..... | G06F 11/2025 714/4.11 |
| 2007/0180077 A1* | 8/2007 | Letca | ........ | H04L 43/0817 709/223 |
| 2009/0063886 A1* | 3/2009 | Arimilli | ........ | G06F 1/12 713/400 |
| 2010/0017409 A1* | 1/2010 | Rawat | ............ | G06F 17/30171 707/E17.007 |
| 2011/0299386 A1* | 12/2011 | Negoto | ........ | H04L 45/22 370/221 |
| 2014/0006465 A1* | 1/2014 | Davis | ........ | G06F 17/30194 707/827 |
| 2014/0321448 A1* | 10/2014 | Backholm | .......... | H04W 76/045 370/338 |
| 2015/0067414 A1* | 3/2015 | Tripathi | .......... | G06F 11/0727 714/55 |
| 2016/0004610 A1* | 1/2016 | Knight | ........ | G06F 11/203 714/4.11 |
| 2016/0165463 A1* | 6/2016 | Zhang | ........ | H04L 43/10 370/218 |

* cited by examiner

*Primary Examiner* — Tuan V Thai
*Assistant Examiner* — Tasnima Matin
(74) *Attorney, Agent, or Firm* — Van Pelt, Yi & James LLP (57) ABSTRACT

Techniques to achieve high availability in a multi-controller system are disclosed. In various embodiments, an indication is received that a network ping-based heartbeat mechanism has failed. In response to said indication, an alternative heartbeat is provided at least in part by periodically updating a heartbeat data stored in an on-disk heartbeat data structure, in a portion of a disk that is available to both an active controller and a standby controller of the multi-controller system.

20 Claims, 6 Drawing Sheets

MULTI-TIER MECHANISM TO ACHIEVE HIGH AVAILABILITY IN A MULTI-CONTROLLER SYSTEM

BACKGROUND OF THE INVENTION

Storage systems may include a plurality of solid state or other disk drives (e.g., SSD's) and may enable one or more clients to access and store data, e.g., via network file server (NFS) or other distributed file system calls.

A storage system may expose an Internet Protocol (IP) address to be used by clients to connect to the storage system. An entity such as a storage "controller" may be provided to manage remote access to data storage resources of the storage system.

Redundancy may be used to ensure high availability. For example, a storage system may include an "active" controller that is currently engaged in providing access to storage resources, e.g., in response to NFS or other storage operation requests received from remote clients. Another controller may be configured as a "standby" controller. A standby controller may monitor the active controller and other storage system state information. The standby controller may be configured to detect a failure of the active controller and to take over the role of active controller in the event a failure is detected.

Known techniques to monitor for and detect failure of an active controller include periodically sending a ping to the active controller and monitoring for a response. Pings may be sent and responses received via an internal network connection. However, if the internal network connection fails or becomes slow, the ping and/or response may not be received.

Some prior art storage systems fallback on a secondary technique to verify status of the active controller in the event a response is not received from the active controller after a prescribed number of pings. In one approach, the active controller may be configured to refresh SCSI keys if it stops receiving pings. The standby controller can check to see if the keys have been refreshed, e.g., since last checked and/or within a prescribed interval. If so, the active will be determined to still be alive, despite the failure to receive responses to pings. However, internal network or other communication failures may be common, and SCSI key refreshes are expensive (e.g., time consuming) operations.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A multi-tier mechanism to achieve high availability in a multi-controller system is disclosed. In various embodiments, if an active controller detects ping failure, the active controller begins to periodically update data in a disk-based data structure in an area (e.g., partition) to which both the active controller and a standby controller have access. The standby controller checks the data structure, in the event of ping failure, to determine whether the active controller has begun to update data in the shared disk-based data structure. In some embodiments, the standby controller updates data values (e.g., other data values) in the shared data structure, to signal to the active controller that the standby controller has switched over to using the shared data structure to monitor health of the active controller (e.g., due to ping failure). In various embodiments, SCSI key refresh may be used as a third technique, but only in the event the disk-based heartbeat disclosed herein fails.

Figure 1:
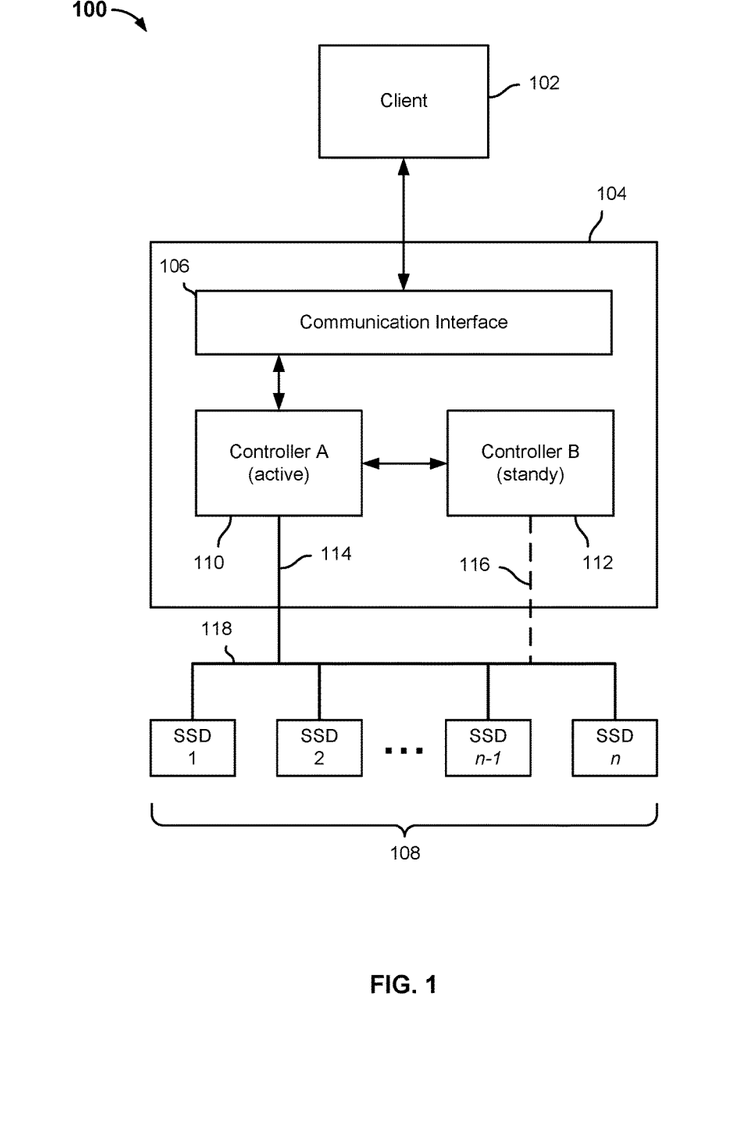
FIG. 1 is a block diagram illustrating an embodiment of a storage system and environment.

FIG. 1 is a block diagram illustrating an embodiment of a storage system and environment. In the example shown, storage system and environment 100 includes a client system (or device, such as a smart phone, tablet, etc.) 102 configured to access a remote and/or distributed storage system via a front end storage server 104. Storage server 104 includes a communication interface, e.g., a network interface card and associated hardware and/or software elements, to communicate with remote clients such as client system 102. Storage server 104 provides remote, shared access to storage resources, include a set of n solid state drives (SSD) 108. Access is provided via an active controller 110, and a standby controller 112 is maintained in hot/ready standby. The active controller 110 and standby controller 112 may be software components provided by using a hardware processor comprising storage server 104 (not shown) to execute computer instructions (e.g., software) to provide the controllers. The controllers 110, 112 have respective connections 114, 116 to SSD's 108 via an interconnect 118.

In various embodiments, a disk-based heartbeat data structure may be stored in a partition on each of one or more solid state drives that is accessible to both the active controller 110 and standby controller 112. In the event the communication of pings and responses between the standby controller and the active controller fails (e.g., one or the other of the nodes stops communicating pings/responses, the network connection between them fails, etc.) the active controller begins to update (refresh) data values in the shared on-disk heartbeat data structure. The standby controller checks the shared on-disk heartbeat data structure. If an update is determined to have been made by the active controller within a prescribed time, the standby controller concludes that the active controller remains alive and active, despite the ping failure.

In some embodiments, a shared on-disk heartbeat data structure may be stored on each of a prescribed number of drives in SSD array 108. SSD array 108 may include any number of SSD's. For example, in one embodiment, 24 SSD's are included. In some embodiments, 2 of the 24 SSD's may be used to store operating system data, e.g., to redundantly support an operating system of storage server 104. One or more SSD's may be kept in reserve, as spares, and the remaining SSD's may be used to store user data.

In various embodiments, the storage system of FIG. 1 may have one or more guarantees associated therewith. For example, a vendor providing storage system 100 of FIG. 1 may guarantee an ability to continue operation despite (or at least recover gracefully from) a loss of one, two, or more drives. For example, a single lost drive may be replaced by a spare drive in array 108, and the system may be configured to tolerate loss of a one drive before encountering significant performance problems.

In some such embodiments, a shared on-disk heartbeat data structure may be stored on a subset of disks in the array 108, the number included in the subset being determined at least in part by adding one to a number of disk failures the storage system is guaranteed to tolerate. For example, the storage system may be advertised as being able to tolerate loss of one drive. In some embodiments, in such a system an instance of a shared on-disk heart beat data structure may be maintained on respective shared partitions on each of two drives. Upon loss of one drive, even one on which an on-disk heartbeat data structure is stored, at least the other drive storing an on-disk heartbeat data structure would remain available. Similarly, in a system configured to tolerate loss of two drives, an on-disk heartbeat data structure may be stored on each of three drives, and so on.

Figure 2:
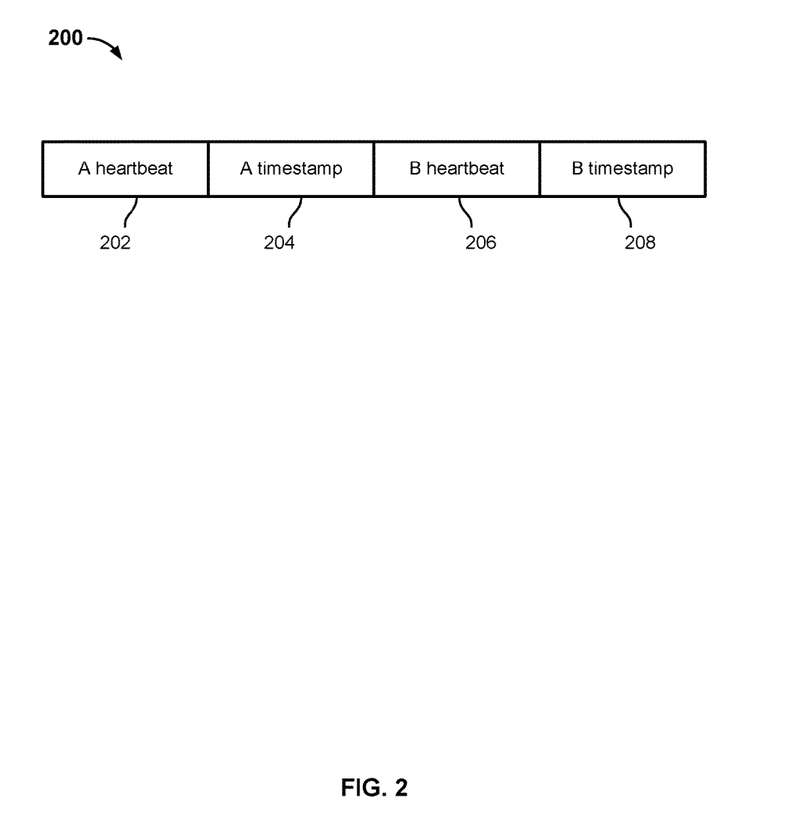
FIG. 2 is a block diagram illustrating an example of a shared on-disk heartbeat data structure in an embodiment of a multi-controller system.

FIG. 2 is a block diagram illustrating an example of a shared on-disk heartbeat data structure in an embodiment of a multi-controller system. In various embodiments, a data structure such as heartbeat data structure 200 of FIG. 2 may be shared by an active controller and one or more standby or other backup controllers, such as active controller 110 and standby controller 112 of FIG. 1, and may be stored on one or more drives, such as SSD's n−1 and n in SSD array 108 of FIG. 1. In the example shown in FIG. 2, heartbeat data structure 200 includes an active controller heartbeat data storage location 202 and an active controller timestamp storage location 204. The active controller may be configured to update the heartbeat data storage location 202, e.g., in response to detecting that it is no longer receiving pings from the standby controller, and to indicate the time of update in timestamp storage location 204. Similarly, heartbeat data structure 200 of FIG. 2 includes a standby controller heartbeat data storage location 206 and a standby controller timestamp storage location 208. The standby controller may be configured to update the heartbeat data storage location 206, e.g., in response to detecting that it is no longer receiving responses to pings sent to the active controller, and to indicate the time of update in timestamp storage location 208. In some embodiments, different structures than those shown in FIG. 2 and/or different values than those described above may be stored. For example, the active controller heartbeat data storage location 202 and an active controller timestamp storage location 204 may be replaced by a data structure comprising storage locations for a latest (most recent) active heartbeat-timestamp tuple, followed by a circular list of up to N previous heartbeat-timestamp entries stored for debugging/failure analysis. Similarly, the standby portion of the data structure may have a location in which a latest heartbeat-timestamp tuple is stored, followed by N (or some other number) of previous entries. Each of the active controller and the standby controller may have at least read only access to the entire heartbeat data structure 200, enabling each to read any update and/or timestamp written by the other, to determine as disclosed herein whether the other remains active and/or has failed over to using the on-disk heartbeat data structure to indicate and/or evaluate the aliveness of the other, instead of using pings.

Figure 3:
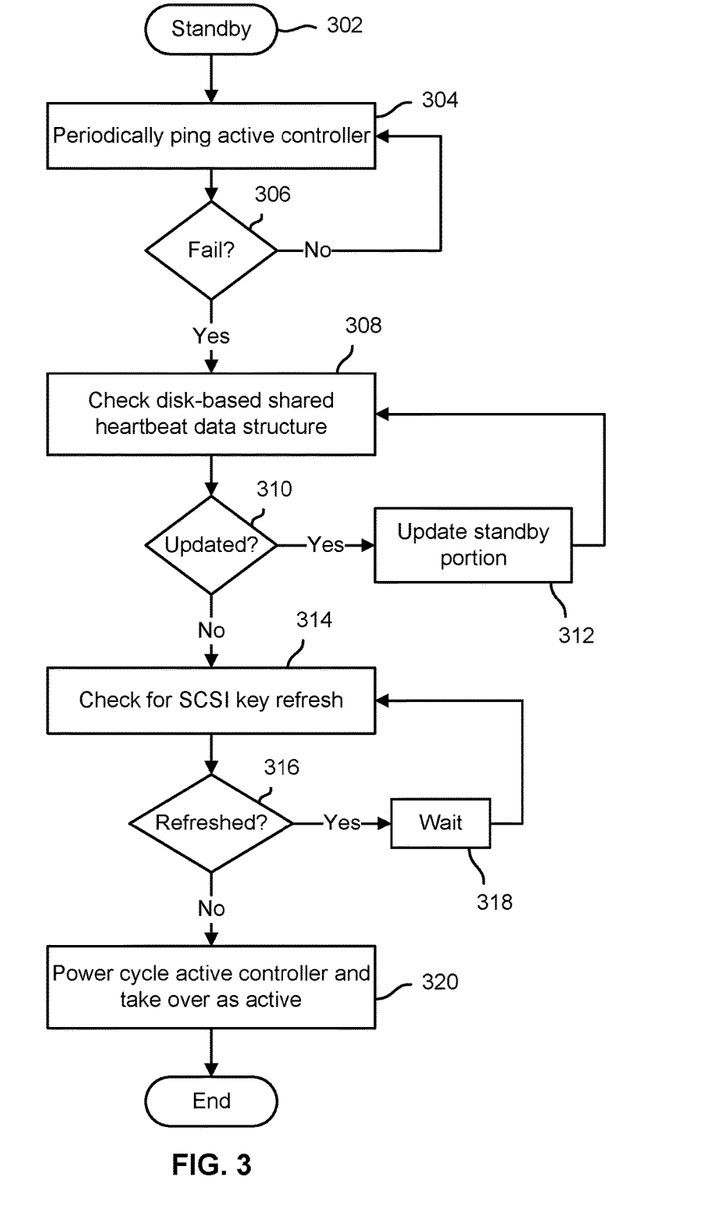
FIG. 3 is a flow chart illustrating an embodiment of a multi-tier process to detect failure of an active controller.

FIG. 3 is a flow chart illustrating an embodiment of a multi-tier process to detect failure of an active controller. In various embodiments, the process of FIG. 3 may be implemented by a standby controller, such as controller 112 of FIG. 1. In the example shown, while in a standby state (302) a standby controller periodically sends a ping to the active controller via an internal network connection, and checks whether the active controller responds within a prescribed interval (304). If the active controller fails to respond on time to a prescribed (e.g., configured) successive number of pings (e.g., two, in some embodiments) and/or any other indication of ping protocol and/or network failure is received (306), the standby controller enters a state in which it no longer sends pings but instead checks an on-disk heartbeat data structure, on one or more disks (e.g., SSD's) to determine if the active controller has begun to update periodically associated heartbeat data in the shared data structure (308). If updates are detected (310), the standby controller concludes the active controller is still alive and also updates a standby controller heartbeat data in the shared data structure (312). In various embodiments, the updating of data by the standby controller indicates to the active controller that the standby controller has read the active controller's heartbeat data from the shared data structure.

In some embodiments, updating and reading of the heartbeat data as stored by the active controller and the standby controller, respectively, each in its corresponding portion of the shared heartbeat data structure may continue, e.g., unless/until pings resume, or an administrator intervenes, or the shared used of the on-disk heartbeat data structure breaks down, e.g., because one or the other of the controllers can no longer access the disk(s) on which the data structure is stored. In some embodiments, both the standby controller may be configured to continue sending pings while also checking and updating the on-disk heartbeat data structure. If responses from the active controller resume, in some embodiments, the standby controller may discontinue updating or checking for updates of the on-disk data structure.

If updates by the active controller cease, or were never detected in the first place (310), the standby controller checks to see if the active controller has refreshed (e.g., since last checked and/or within a prescribed interval) keys, such as SCSI keys, associated with the disks (e.g., SSD) comprising the storage array (314). In some embodiments, a prescribed number of keys fewer than all keys may be checked. In some embodiments, keys may be checked only until a key that has been refreshed is found, up to a prescribed maximum number of drives (e.g., first six of 24 drives) comprising the array.

If the (prescribed number of) keys are found to have been refreshed (316), the standby controller determines the active controller is still alive and waits (318) a prescribed interval before checking whether the keys have been refreshed again (314, 316). The standby controller may continue to check the keys at the prescribed interval (314, 316, 318) unless/until pings resume, or an administrator intervenes, or the standby controller determines the active controller is no longer refreshing the keys. In some embodiments, the active controller may continue to check for pings and/or may continue to update the on-disk heartbeat data structure, even while refreshing SCSI keys. If pings begin to be received again, for example, the active controller may discontinue using other techniques, i.e., on-disk heartbeat data structure and/or key refresh. Likewise, the standby controller may be configured to continuing sending pings, if able, and/or checking and updating the on-disk heartbeat data structure, even while relying on the key refresh technique. Once a more preferred technique to determine liveness becomes usable/reliable again, e.g., pings or on-disk heartbeat data structure, the standby controller may discontinue checking for key refreshes.

If the active controller stops refreshing the keys or never began to refresh them (316) (and, in some embodiments, if pings and timely responses have not resumed), the standby controller power cycles (or otherwise resets) the active controller and takes over the role of active controller (320), after which the process of FIG. 3 ends.

Figure 4:
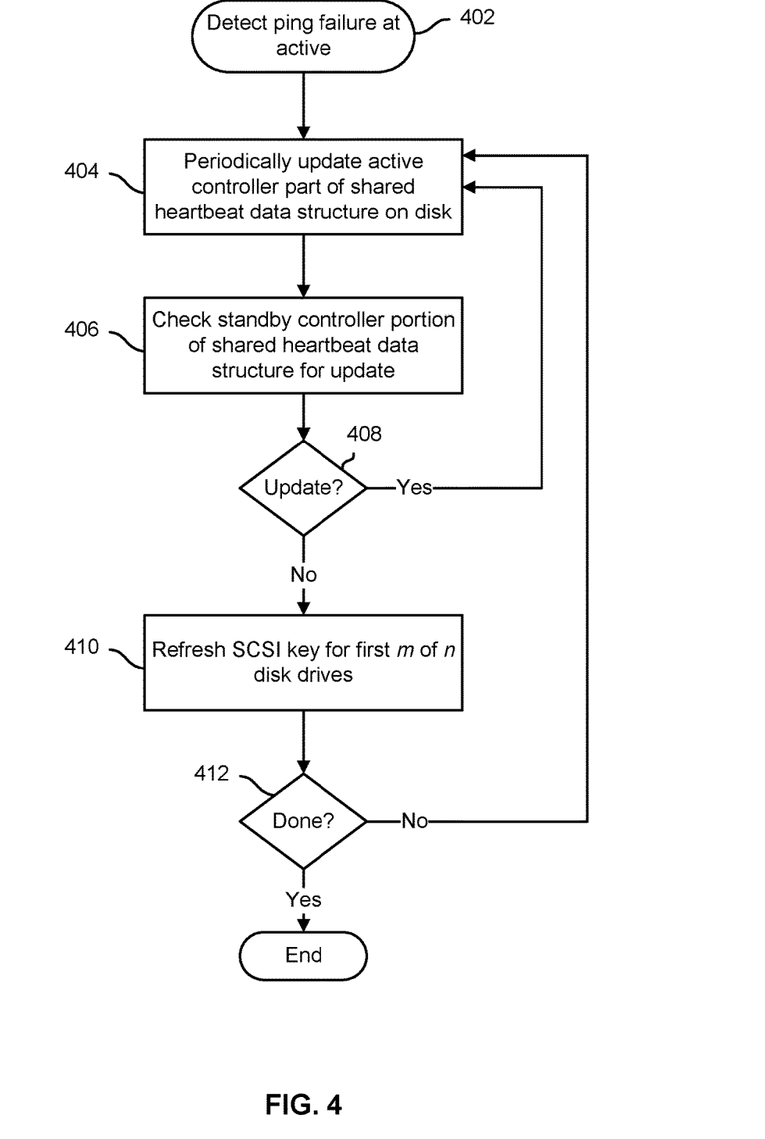
FIG. 4 is a flow chart illustrating an embodiment of a process to react to failure by an active controller to receive an expected ping from a standby controller.

FIG. 4 is a flow chart illustrating an embodiment of a process to react to failure by an active controller to receive an expected ping from a standby controller. In various embodiments, the process of FIG. 4 may be implemented by an active controller, such as controller 110 of FIG. 1. In the example shown, upon detecting failure of a network ping-based heartbeat (402), the active controller begins to periodically update data in a shared, on-disk heartbeat data structure accessible to both the active controller and the standby controller (404). The active controller checks a portion of the shared on-disk heartbeat data structure that is associated with the standby controller, to determine whether the standby controller has updated values stored in that portion (406). In some alternative embodiments, the standby controller does not write a heartbeat data to the on-disk data structure, and steps 406 and 408 are omitted.

So long as the standby controller continues to update the standby controller's portion of the on-disk heartbeat data structure, the active controller continues to update its portion of the data structure, at the prescribed interval (404, 406, 408). If the standby controller stops updating its portion of the on-disk heartbeat data structure, or if it never began doing so (408), the active controller switches over to a further alternative heartbeat mechanism, which in this example includes periodically refreshing a SCSI key value for each of the first m disks in the n disk array (e.g., first six of twenty-four). In various embodiments, the number of disks for which the SCSI key is refreshed is determined at configuration time to ensure that at least one disk containing user data, as opposed to storing operating system or other system data and/or serving as a spare, will be refreshed and checked. After each refresh, the active controller again updates the active controller portion of the on-disk heartbeat data structure (404) and checks for an update by the standby controller (406). If there is still no update by the standby controller (408), the active controller refreshes keys again (410), and so on.

The active controller continues to refresh the prescribed number of keys at the prescribed interval unless/until pings resume (402), the standby resumes updating the on-disk heartbeat data structure (406, 408), or an administrator intervenes, etc. (412).

Figure 5:
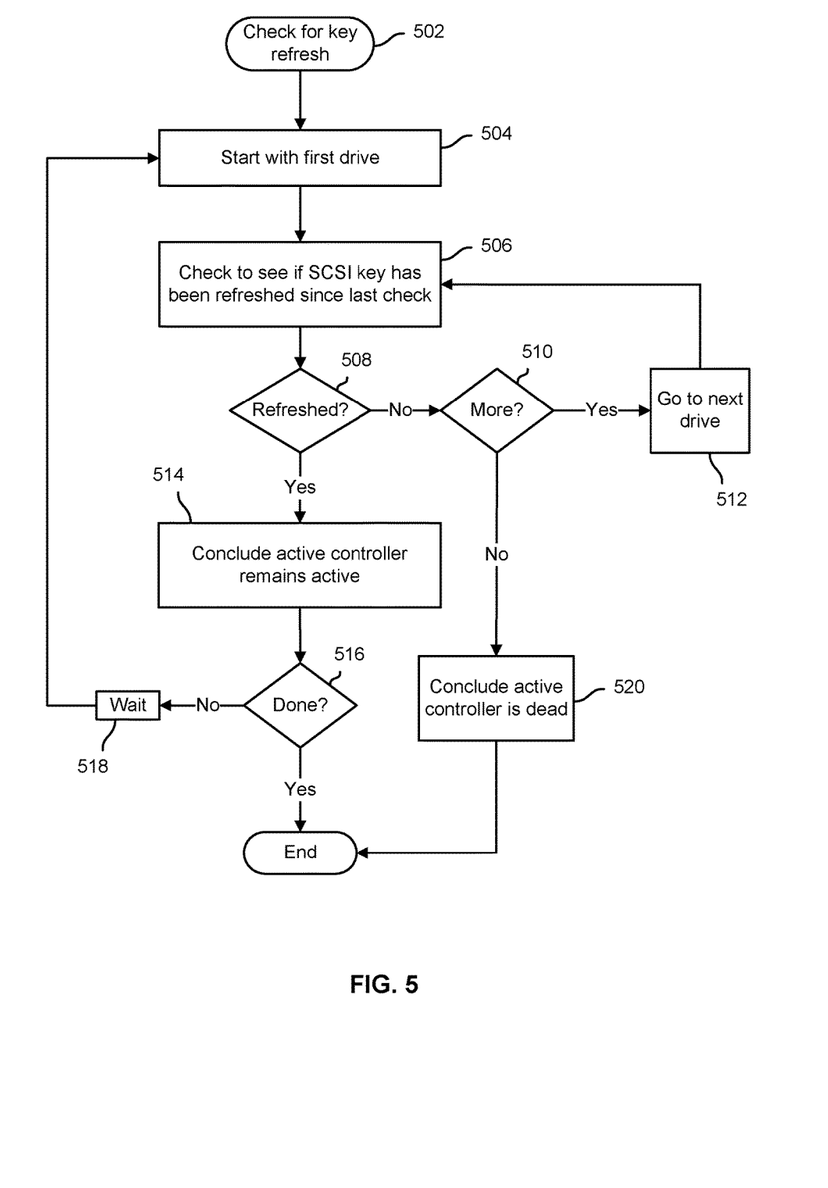
FIG. 5 is a flow chart illustrating an embodiment of a process to check for refreshed keys to determine whether an active controller remains alive.

FIG. 5 is a flow chart illustrating an embodiment of a process to check for refreshed keys to determine whether an active controller remains alive. In various embodiments, the process of FIG. 5 may be implemented by a standby controller, such as controller 112 of FIG. 1. In various embodiments, step 312 of FIG. 3 may be implemented using the process of FIG. 5. In the example shown, a standby controller enters a state in which it is checking to see if the active controller has refreshed SCSI keys to communicate to the standby that the active is still alive (502). Starting with a first drive (504), the standby controller checks to see if the SCSI key for that drive has been refreshed by the active controller within a prescribed interval (506). If the key has not been refreshed (508), the standby controller moves on to a next drive in a set of drives the respective SCSI keys of which the active controller is configured to update (e.g., upon failure of ping and on-disk heart beat data structure heartbeats, as disclosed herein) (510, 512), and continues to iterate through the drives unless/until a key that has been refreshed within the prescribed interval is encountered (508), in which case the standby controller concludes the active controller is still alive (514), or until all of the keys that should have been refreshed have been checked without encountering one that has been refreshed (510), in which case the standby controller concludes the active controller is no longer alive (520).

If the active controller is determined to be alive (514), a next iteration of checking for refreshed keys is performed at a prescribed interval (516, 518), unless/until the standby controller reverts to another heartbeat technique (516), e.g., pings resume, an administrator intervenes, etc.

In the approach shown in FIG. 5, if the active controller successfully refreshes the respective SCSI keys of the first m drives, the standby controller should find on checking the first one that the key has been refreshed within the prescribed interval, avoiding the need to check any of the others.

In some alternative embodiments, the standby controller does not check keys not done serially, as shown in FIG. 5, but in parallel. Multiple threads are created which query the SSDs for the key and return it to a parent thread. The parent then calculates a hash of all the keys, so if even 1 key has changed it will know that by comparing to the previous hash.

Figure 6:
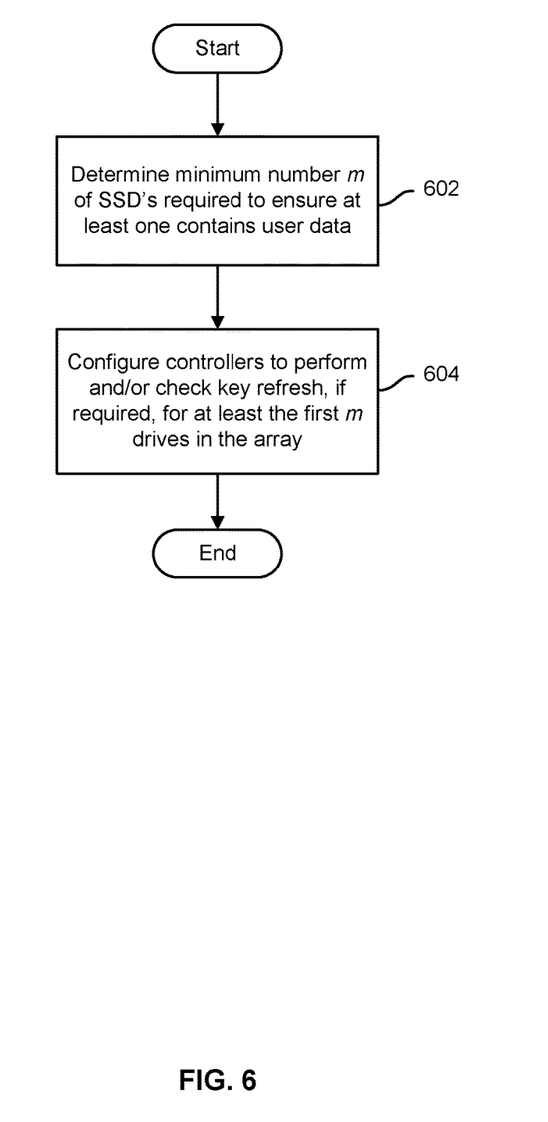
FIG. 6 is a flow chart illustrating an embodiment of a process to configure controllers of a multi-controller system to use key refresh as a backup heartbeat.

FIG. 6 is a flow chart illustrating an embodiment of a process to configure controllers of a multi-controller system to use key refresh as a backup heartbeat. In the example shown, a minimum number of disks m required to ensure that at least one disk containing user data is available is determined (602). For example, if in a given array of twenty-four (24) SSD's or other disks two are reserved for use by the operating system and/or other system use, one is a spare, and up to two may be allowed to fail without storage system failure, the number m may be determined to be six, i.e., 2 operating system+1 spare+2 failed+at least 1 user data=6. The controllers are configured to perform and/or check for refreshed keys on the first m disks in the array (604).

While in some embodiments described herein a multi-tier approach is used to achieve high availability in a multi-controller storage system, techniques disclosed herein may be used as well in multi-controller systems other than storage systems. While in some embodiments a third tier involving use of SCSI or other key refreshes to provide a heartbeat signal may be used, e.g., in the event of failure of a heartbeat provided via a shared, on-disk heartbeat data structure, in some embodiments only a two-tiered (e.g., pings and on-disk data structure, but not key refresh) may be used, or a third (or other) tier other than key refresh may be used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A multi-controller system, comprising:
a processor configured to:
receive an indication that a network ping-based heartbeat mechanism has failed; and
in response to said indication, providing an alternative heartbeat at least in part by periodically updating a heartbeat data stored in an on-disk heartbeat data structure, in a portion of a disk that is available to both an active controller and a standby controller of the multi-controller system; and
a memory coupled to the processor and configured to provide the processor with instructions;
wherein the processor is further configured to detect that the on-disk heartbeat data structure-based alternative heartbeat has failed and in response switch over to a SCSI key refresh-based heartbeat mechanism.

2. The system of claim 1, wherein the standby controller is configured to read the updated heartbeat data from the on-disk heartbeat data structure.

3. The system of claim 2, wherein the standby controller is configured to read the heartbeat data from the on-disk heartbeat data structure; determine whether the heartbeat data read from the on-disk heartbeat data structure has been updated within a prescribed interval; and conclude based at least in part on the determination whether the active controller remains alive.

4. The system of claim 3, wherein the standby controller is further configured to update a standby controller portion of the on-disk heartbeat data structure, based at least in part on a determination that the heartbeat data read by the standby controller from the on-disk heartbeat data structure has been updated within the prescribed interval.

5. The system of claim 4, wherein the active controller is configured to read the standby controller portion of the on-disk heartbeat data structure; determine based at least in part on the data read from the whether the standby controller portion of the on-disk heartbeat data structure has been updated within a prescribed interval; and conclude based at least in part on the determination whether the standby controller is using the on-disk heartbeat data structure to determine whether the active controller is still alive.

6. The system of claim 1, wherein the on-disk heartbeat data structure comprises an identical data structure stored on each of a plurality of storage disks comprising the multi-controller system.

7. The system of claim 1, wherein the standby controller is configured to check to determine whether a key refresh has been performed by the active controller, and to determine based at least in part on a detected key refresh that the active controller is still alive.

8. The system of claim 7, wherein the standby controller concludes upon detecting a first refreshed key, without checking one or more other keys, that the active controller is still alive.

9. The system of claim 1, wherein the active controller is configured to refresh the respective SCSI key of a subset of disks comprising a storage array with which the multi-controller system is associated.

10. A method to achieve high availability in a multi-controller system, comprising:
receiving an indication that a network ping-based heartbeat mechanism has failed;
in response to said indication, providing an alternative heartbeat at least in part by periodically updating a heartbeat data stored in an on-disk heartbeat data structure, in a portion of a disk that is available to both an active controller and a standby controller of the multi-controller system; and
in response to detecting that the on-disk heartbeat data structure-based alternative heartbeat has failed, switching over to a SCSI key refresh-based heartbeat mechanism.

11. The method of claim 10, wherein the standby controller is configured to read the updated heartbeat data from the on-disk heartbeat data structure.

12. The method of claim 11, wherein the standby controller is configured to read the heartbeat data from the on-disk heartbeat data structure; determine whether the heartbeat data read from the on-disk heartbeat data structure has been updated within a prescribed interval; and conclude based at least in part on the determination whether the active controller remains alive.

13. The method of claim 12, wherein the standby controller is further configured to update a standby controller portion of the on-disk heartbeat data structure, based at least in part on a determination that the heartbeat data read by the standby controller from the on-disk heartbeat data structure has been updated within the prescribed interval.

14. The method of claim 13, wherein the active controller is configured to read the standby controller portion of the on-disk heartbeat data structure; determine based at least in part on the data read from the whether the standby controller portion of the on-disk heartbeat data structure has been updated within a prescribed interval; and conclude based at least in part on the determination whether the standby controller is using the on-disk heartbeat data structure to determine whether the active controller is still alive.

15. The method of claim 10, wherein the on-disk heartbeat data structure comprises an identical data structure stored on each of a plurality of storage disks comprising the multi-controller system.

16. The method of claim 10, wherein the standby controller is configured to check to determine whether a key refresh has been performed by the active controller, and to determine based at least in part on a detected key refresh that the active controller is still alive.

17. The method of claim 16, wherein the standby controller concludes upon detecting a first refreshed key, without checking one or more other keys, that the active controller is still alive.

18. A computer program product to achieve high availability in a multi-controller system, the computer program product being embodied in a non-transitory computer readable medium and comprising computer instructions for:
- receiving an indication that a network ping-based heartbeat mechanism has failed;
- in response to said indication, providing an alternative heartbeat at least in part by periodically updating a heartbeat data stored in an on-disk heartbeat data structure, in a portion of a disk that is available to both an active controller and a standby controller of the multi-controller system; and
- in response to detecting that the on-disk heartbeat data structure-based alternative heartbeat has failed, switching over to a SCSI key refresh-based heartbeat mechanism.

19. The computer program product of claim 18, wherein the standby controller is configured to read the updated heartbeat data from the on-disk heartbeat data structure.

20. The computer program product of claim 19, wherein the standby controller is configured to read the heartbeat data from the on-disk heartbeat data structure; determine whether the heartbeat data read from the on-disk heartbeat data structure has been updated within a prescribed interval; and conclude based at least in part on the determination whether the active controller remains alive.

* * * * *